United States Patent [19]

Malakhoff et al.

[11] 4,285,414
[45] Aug. 25, 1981

[54] SUPPORTED MEMBRANE PLANER FOR SES SEALS

[75] Inventors: Alexander Malakhoff, Arlington, Va.; Sydney Davis, Silver Spring, Md.

[73] Assignee: The United States of America as represented by the Secretary of the Navy, Washington, D.C.

[21] Appl. No.: 99,151

[22] Filed: Nov. 30, 1979

[51] Int. Cl.³ ............................................. B60V 1/04
[52] U.S. Cl. ................................. 180/126; 114/67 A
[58] Field of Search ............... 180/126, 127, 128, 116, 180/124; 114/67 A, 67 R

[56] References Cited

U.S. PATENT DOCUMENTS

| 3,221,831 | 12/1965 | Weiland | 180/116 |
| 3,288,236 | 11/1966 | Padial | 180/126 |
| 3,416,626 | 12/1968 | Nagamatsu | 180/124 |
| 3,532,180 | 10/1970 | Ford | 180/126 |
| 4,083,425 | 4/1978 | Rickards | 180/126 |
| 4,137,987 | 2/1979 | Plackett | 180/126 |

*Primary Examiner*—John P. Silverstrim
*Attorney, Agent, or Firm*—R. S. Sciascia; L. A. Marsh; W. W. Randolph

[57] ABSTRACT

A seal structure for an air cushion vessel includes an inflatable bag secured to the hull and a plurality of juxtaposed, interconnected planer members maintained in operative position beneath the bag by a plurality of support straps. Each planer member includes a transversely reinforced shell portion and a flexible, resilient membrane secured to the longitudinal edge portions of the shell portion to form a flexible planing surface for the seal structure. The planer members may have tapered aft end portions and curved planing surfaces to provide a gradual change of the interface between the planer members and the water.

11 Claims, 11 Drawing Figures

SUPPORTED MEMBRANE PLANER FOR SES SEALS

The invention described herein may be manufactured and used by or for the Government of the United States of America for any governmental purposes without the payment of any royalties thereon or therefor.

BACKGROUND OF THE INVENTION

This invention generally relates to seal structures for Surface Effect Ships (SES) and more particularly to a bag and planer type of seal structure which includes lightweight planer members for minimizing the effect of impact loads.

Surface Effect Ships of the type also referred to as Captured Air Bubble (CAB) vessels utilize a cushion of air contained in a plenum chamber beneath the vessel for supporting the vessel above the surface of the ground or water. In marine SES vessels the plenum chamber is commonly defined as a space between a pair of spaced, depending sidewalls with bow and stern seals extending athwartships between respective fore and aft end portions of the sidewalls. Particular performance criteria with seal structures for the SES vessels include: preventing excessive loss of pressurized air from the plenum chamber through and around the seals; providing a strong seal structure which is lightweight and flexible enough to exhibit rapid response characteristics to various wave conditions; and minimizing the effect of large drag and impact forces exerted on the seals by the waves. Although various types of seal structures, such as the planer, the bag and finger, and the bag and planer types of seal construction have been proposed to accommodate these criteria, additional design requirements for the new generation of large, high speed SES vessels have precluded the use of many seal designs in such vessels. For example, large SES vessels generally require large, lightweight and flexible seal structures having rapid response characteristics to accommodate rapid variations in the water surface at high speeds. Further, the seal structures must be durable enough to endure impact and dynamic seal weight loads imposed thereon under severe sea state conditions.

It was found, for example, that when many prior types of seal structures are scaled up to fit large SES vessels, such seal designs become unduly heavy, ponderous and unresponsive to various sea state conditions. For instance, although the planing seal disclosed in U.S. Pat. No. 3,532,180 granted to Ford and Wilson appears to be adaptable to small vessels, it has been difficult to scale the seal structure up to the size required for large SES vessels. The Ford seal structure includes a membrane and a plurality of flexible rods or spring steel strips incorporated therein for supporting the membrane. However, the rods or steel strips do not lend themselves to scaling up in size since they become heavier and stiffer as their dimensions are increased, which accordingly reduces their response and planing characteristics.

One example of a proposed seal structure for large SES vessels is disclosed in U.S. Pat. No. 4,137,987 granted to M. Plackett. The Plackett seal generally comprises a flexible bag structure secured between two spaced sidewalls and a planer seal portion of juxtaposed, elongated planer members or planers connected to the hull beneath the bag structure. The planers are maintained in operative position by a cooperative arrangement of support stays, which extend in front of the membrane and are connected to the fore end regions of both the planers and the hull, and the retracting and geometry straps, which extend from the hull and are connected to the aft end portions of the planers. In operative position the elongated planers are designed to act as planing surfaces for riding over the surface wave discontinuities and for isolating the wave impact forces acting on the planers from the hull section of the vessel. This is generally accomplished by supporting the aft or free end portions of the planers with a flexible arrangement of retracting and geometry straps that permit the planers to deflect in the fore and aft as well as in the up and down directions. A biasing or equilibrium means for causing the planers to return to a predetermined equilibrium position is provided by the bag structure which, upon inflation, exerts an outward pressure on the stay members. However, large scale seal structures utilizing the planers embodied in the Plackett patent have proved to be rather heavy and subject to severe slamming loads, due to their weight and stiffness characteristics, as the planers encounter the waves at high speeds. The heavy weight of the planers also tends to cause the seal structure to be highly stressed under severe operating conditions, such as "snap back". Snap back of the planers occurs after the lower portion of the seal is forced toward the hull by a wave which, after the wave passes the seal structure, causes a gap between the lower portion of the seal and the surface of the water. Under the influence of gravity and the cushion pressure, the planers accelerate toward the water until they are restrained or "snatched" by the flexible retracting and geometry support straps. Under such condition severe stresses are exerted on both the retracting and geometry support straps and the planers. Attempts to strengthen the Plackett planers with various reinforcing means tends to reduce the flexibility and responsive characteristics of the planers which accordingly induces larger impact and drag forces on the seal structure.

SUMMARY OF THE INVENTION

The improved seal structure for an SES vessel of the aforementioned type overcomes many drawbacks encountered with the prior art and generally includes an inflatable bag secured to the hull between the vessel's sidewalls and a plurality of elongated juxtaposed planers maintained beneath the bag, between the sidewalls. Each planer is of lightweight design to minimize the effects of loads and stresses acting thereon and is formed of an elongated shell with spaced transverse stiffeners for reinforcing the shell against bending moments and localized buckling. A flexible, resilient membrane is attached to the longitudinal edge portions of the shell to form a planing surface that deforms under the impact of the waves and transfers such forces to the shell. The membranes, which are exposed to the plenum pressure, also function to cushion and dampen the impact forces and slam loads transmitted thereto.

To achieve a lightweight yet efficient planer design, the shell portions of the planers may be fabricated with triangular, arcuate or trapezoidal cross-sections. For wider planer sections the shell may be fabricated of a reinforced truss or box-type construction. This type of construction makes it possible to utilize a wide variety of materials for the shell and stiffener elements such as fiberglass, steel, aluminum and titanium. This form of planer design also lends itself to a streamlined planer construction, as exemplified by one embodiment, wherein the planing surface is curved to achieve less discontinuity between the feather and planing surfaces of the planer and to optimize the angles of planer attack for reducing drag forces thereon. Although the membrane is preferably fabricated of flexible, resilient materials such as elastomer coated, nylon-reinforced fabrics or slightly elastic films, the planer design is also adaptable to accommodate thin metal membranes.

Accordingly, a general object of the present invention is to provide a seal structure for a large, high speed air cushion vehicle wherein the seal structure is capable of operating efficiently under a variety of water surface or sea state conditions.

Another object of this invention is the provision of a lightweight seal structure which is balanced by dynamic pressure loads to automatically adjust to variations in the contour of the supporting water surface.

A further object of the present invention is to provide a lightweight yet strong seal structure which permits efficient and smooth operation of the vessel at high speeds without causing undue impact and drag effects thereon.

Yet another object of this invention is the provision of an economically designed seal structure which has the flexibility and response characteristics to rapidly respond when deployed in a variety of sea state conditions.

Still another object of the present invention is to provide a seal structure of lightweight juxtaposed planers having flexible planing surfaces to lessen the effect of wave impact forces acting thereon.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may be best understood by reference to the following description taken in conjunction with the accompanying drawings, in which:

DETAILED DESCRIPTION OF THE INVENTION

Figure 1:
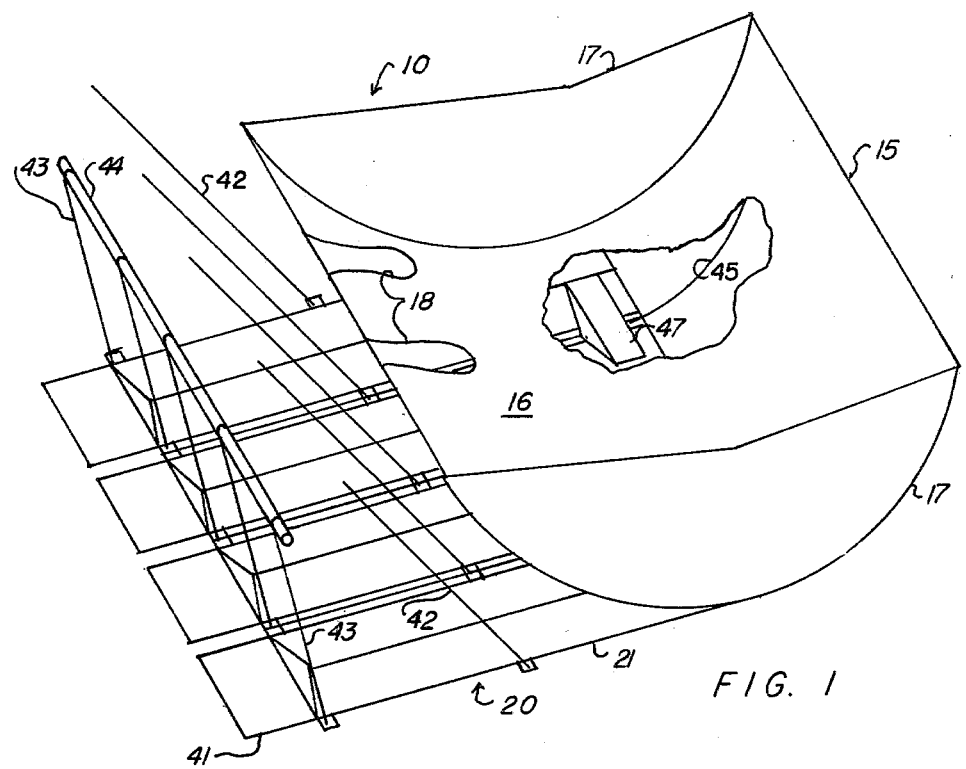
FIG. 1 is a perspective view of a seal structure according to the invention, wherein a portion thereof is broken away.

Referring now to FIG. 1, there is shown a perspective view of a seal structure 10 which, in the disclosed embodiment, is particularly designed for the bow of an air cushion vehicle for sealing the forward end of the plenum chamber. The marine vessels which utilize the seal structure 10 commonly include a hull section with spaced rigid sidewalls depending from the hull and extending the length of the vessel. Bow and stern seals are transversely secured between the sidewalls to respectively seal the bow and stern portions of the plenum chamber. As shown in FIG. 1, the seal structure is of the bag and planer type, including an upper inflatable bag portion 15 and a lower planer portion 20 designed to ride over the surface of the water in a manner similar to a water ski. In performing this function, the planer portion 20 is designed to undergo up and down as well as fore and aft motions in response to both the wave motions and the resulting drag forces imposed on the planer portion 20. To accommodate such motions, a flexible support arrangement is utilized comprising geometry straps 42 and adjustable retracting straps 43 extending from the hull of the vessel and connected to the planers 21. The geometry straps 42 are preferably of fixed operative length and they serve to not only support the individual planers 21 but also to effect a predetermined configuration of the planer portion 20, leaving the aft end portions 22 of the planers 21 capable of being adjusted to accommodate a variety of sea state conditions. The retracting straps 43 are connected to the aft end portions 22 of the planers 21 to adjust the angular position of the planers 21 in relation to the water surface and for limiting the downward deflection of the aft end portions 22 following the passage of a wave. Adjustment of the retracting straps 43 is generally accomplished by rotating a rod means 44 attached to all of the retracting straps 43. The support arrangement also includes a plurality of support cables or stays 45 attached to the hull and extending in front of and beneath the inflatable bag where they are adjustably connected to the fore end portions 23 of the planers 21.

The inflatable bag 15 is designed to exert an outward pressure on the stays 45 so that the planers 21 are biased toward and returned to a predetermined operating or planing position after the planers 21 have been displaced by the wave actions. Although the inflation pressure for the bag 15 may be supplied by various means and arrangements, pressurized air from the hull is preferably introduced into a chamber 16 defined by the undersurface of the hull and the bag structure 15 which includes end caps 17 designed to contact the spaced sidewalls. Apertures 18 are formed in the bag to permit venting of the pressurized air into and out of the chamber 16 as the bag 15 undergoes intermittent localized deformation due to the action of the waves.

Depending upon the width and weight of the planers 21 and the preferred support arrangement, the geometry 42 and retracting 43 support straps can be connected to the planers 21 at a variety of positions. For example, in FIGS. 1 6 and 8, the retracting 43 and geometry 42 support straps are designed to be connected to the longitudinal edge portions 24 of the planers 21 and in FIGS. 2, 3, 4 and 5 the support straps are intended to be secured to the longitudinal central portions 25 of the planers 21. For wide planers, as shown in FIG. 7, the retracting 43 and geometry 42 support straps may be connected to both the longitudinal edge portions 24 and the central portions 25 of the planers 21. Further, the support stays 45 are preferably connected to the fore end portions 23 of the planers 21, as shown in FIGS. 1, 2, 3, 10 and 11, to minimize the tendency of the impact of the waves on the fore end portions 23 to create a pivoting moment that would raise the aft end portions 22 of the planers 21 away from the water surface.

Figure 4:
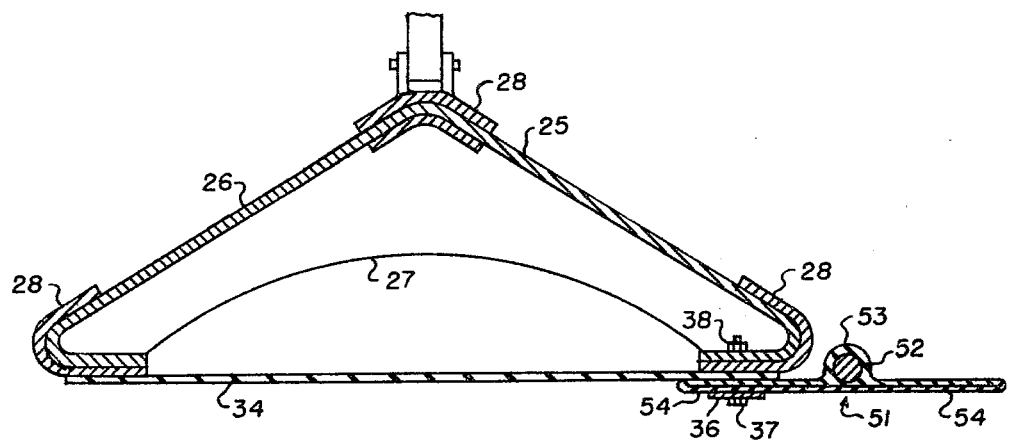
FIG. 4 is a cross-sectional view of a planer of FIG. 1.
Figure 5:
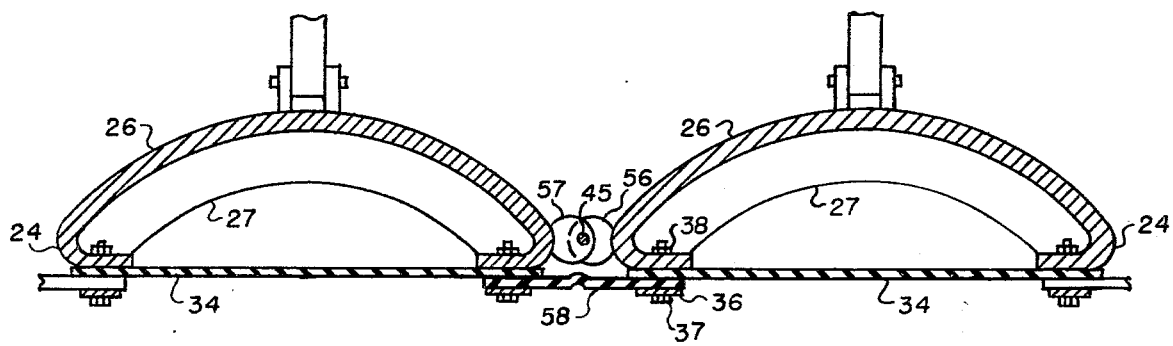
FIG. 5 is a cross-sectional view of a planer similar to the one shown in FIG. 4, but having an arcuate shell.
Figure 6:
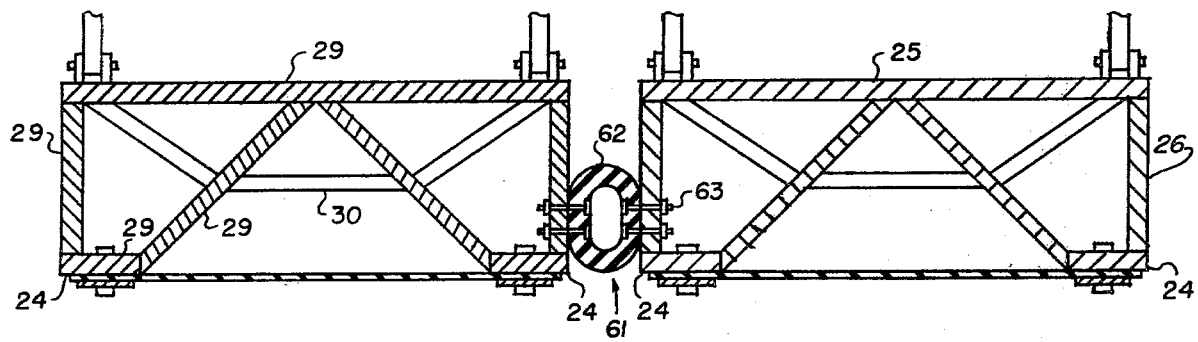
FIG. 6 is a cross-sectional view of a planer having a reinforced rectangular cross-section.
Figure 7:
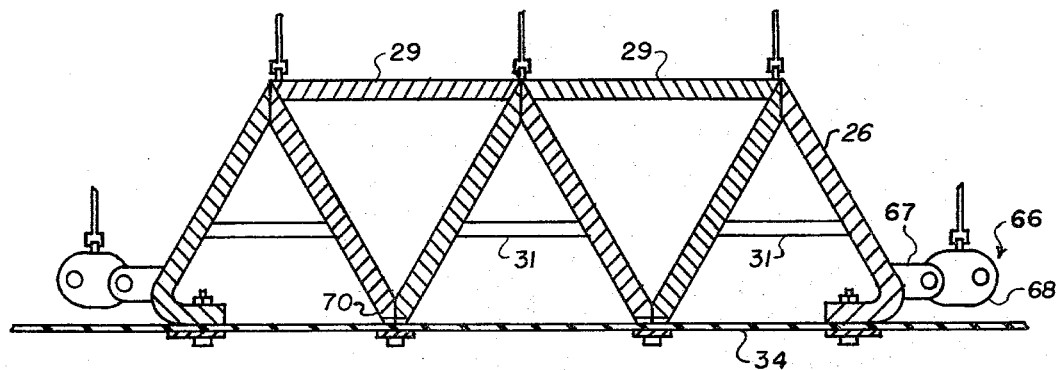
FIG. 7 is a cross-sectional view of a wide planer formed of a plurality of interconnected, inverted V-shaped shells.
Figure 8:
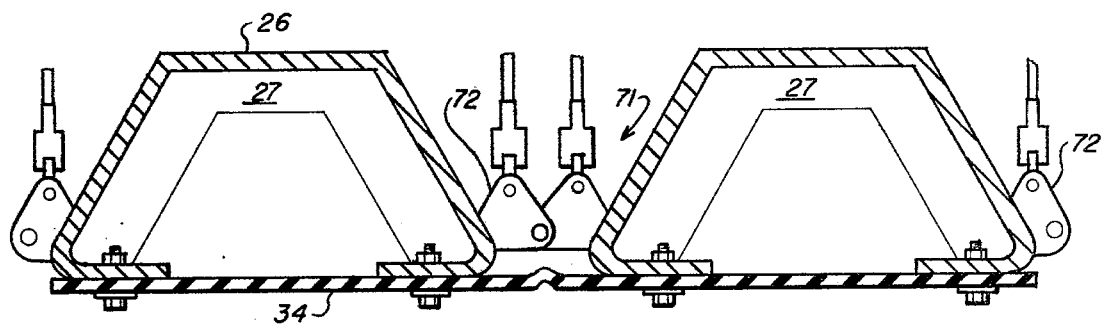
FIG. 8 is a cross-sectional view of a planer having a trapezoidal cross-section.

A variety of means, as generally shown in FIGS. 4, 5, 6 and 8, may be utilized to interconnect the adjacent planers 21. In FIG. 4, for example, the joint structure 51 is formed of a sleeve of elastomer coated, woven material containing a central insert 52 of rope, cable or elastomeric material internally bonded thereto. Subsequently, the sleeve portions are pressed together to form a longitudinal joint structure having a rounded, stiff central portion 53 and flexible flange portion 54 extending therefrom, which are designed to be connected to the longitudinal edge portions 24 of the planers 21. Unlike the joint structure 51 of FIG. 4, the joint structure 56 of FIG. 5 is particularly adapted for the particular instance in which the stays 45 are positioned along the longitudinal edge portions 24 of the planers 21. Means for pivotally interconnecting the adjacent planers 21 in FIG. 5 comprise spaced planer flanges 57 which project from the longitudinal edge portions 24 of the planers 21 and pivotally enclose the stays 45. To properly seal the joint structure 56 of FIG. 5, a membrane section 58 is provided to span the adjacent longitudinal edge portions 24 of the planers 21. In FIG. 6, the joint structure 61 interconnecting the adjacent planers 21 comprises a thick tube 62 of fabric reinforced elastomeric material which is fabricated to deform to accommodate relative planer motions and to act as a shock absorber between the planers. The elongated tube 62 is secured to the adjacent planers 21 with a plurality of fasteners 63 which may be integrally formed with the tube 62. For relatively large planers 21 as shown in FIG. 7, the interplaner joint structure 66 may comprise spaced flanges 67 formed along the longitudinal edge portions 24 of the planers 21 and pivotally connected to intermediate hinge members 68. The interplaner joint structure 71 of FIG. 8, wherein the support straps are connected to the flanges 72, which pivotally interconnect the planers 21, provides an efficient means for reducing the tendency of the planers 21 to undergo wobble and flutter motions as is experienced with some centrally supported planers.

The elongated planers 21 are generally of a lightweight design and have a shell-type, monocoque construction wherein the shell portions 26 of the planers 21 are preferably fabricated of thin plate materials and provided with spaced transverse stiffeners 27 for reinforcing the shell 26 against bending moments and localized buckling stresses. A flexible, resilient membrane 34 is attached to the longitudinal edge portions 24 to form a planing surface that deforms under the impact of the waves and transfers such forces to the shell portion 26 of the planers 21. In operation, the membrane 34 is exposed to the cushion pressure of the plenum chamber through passages in the shell 26 and gaps between the stiffeners 27 and the membrane 34 such that the membrane 34 is maintained in an outwardly biased position. Upon encountering waves and other intermittent impact forces, such as slamming loads, portions of membrane 34 undergo intermittent in and out motions with respect to shell 26 of planer 21 due to the unbalance between the cushion pressure and the impact forces. Such fluctuating motions of the membrane 34, which occur to a different degree at various portions of the membrane 34, cause the forces applied to the membrane 34 to be distributed longitudinally and laterally about the membrane 34. The resulting tension forces acting on the membrane 34 are subsequently distributed to the shell portions 26 of the planers 21 and the support straps.

Figure 2:
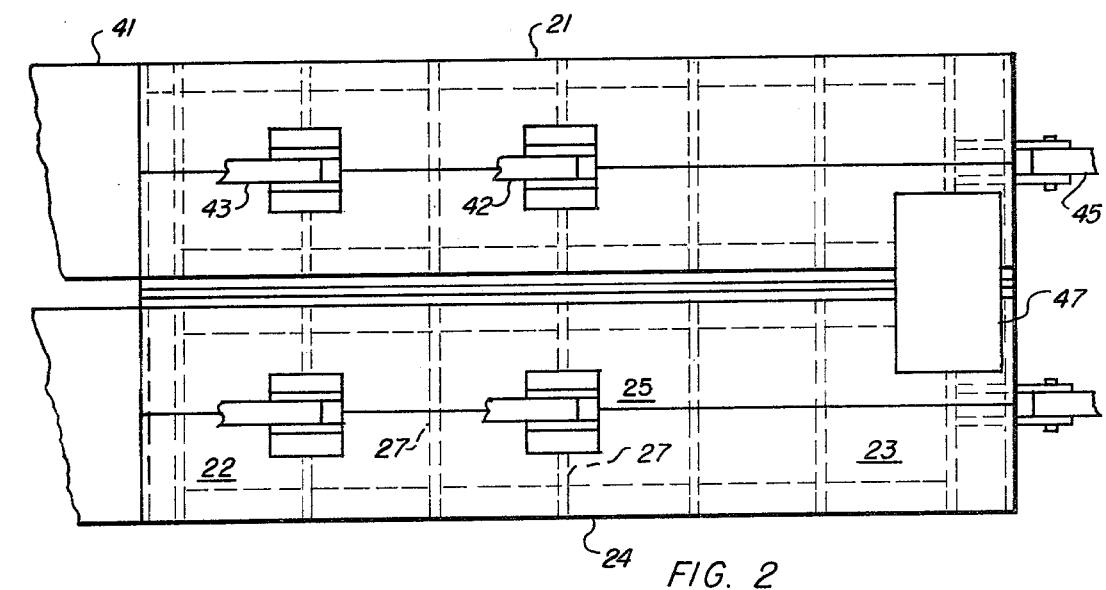
FIG. 2 is a top view of a portion of two adjacent interconnected planers; p
Figure 3:
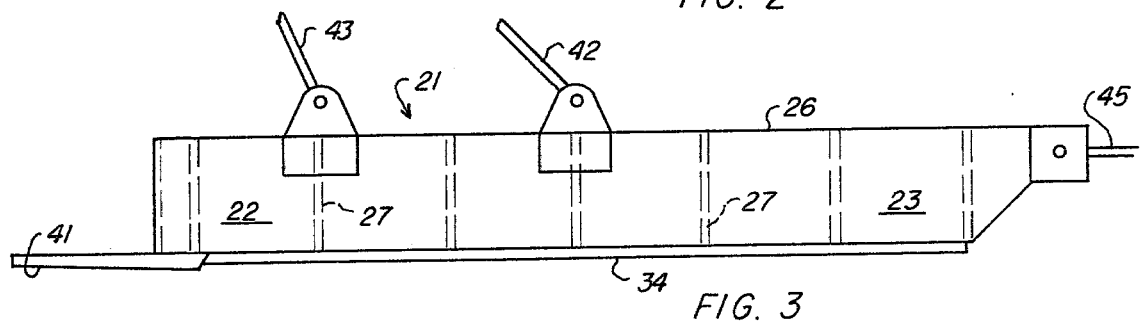
FIG. 3 is a side view of the type of planer shown in FIG. 2.

With reference to the illustrated embodiments of the invention, FIGS. 1 through 4 represent planers 21 having triangular cross-sections. As shown in FIGS. 2 and 3, the shell portions 26 of the planers 21 are reinforced with spaced stiffeners 27 which extend transversely across the planers 21. To provide adequate strength for specific portions of the planers 21 that undergo concentrated or severe loading conditions, such as the support connections for the support straps 42, 43 and the stays 45, the stiffener sections 27 may be positioned thereabout. As further shown in FIG. 4, the longitudinal edge portions 24 and the central portions 25 of the planers 21 may be provided with longitudinal reinforcing elements 28. Thus, the reinforced planer construction of FIG. 4 permits the efficient, economical design and fabrication of lightweight planers 21 which can be constructed to accommodate particular load and stress conditions. Further versatility of the lightweight planer design is exemplified by FIGS. 5 and 8 wherein the planers 21 have arcuate and trapezoidal cross-sections.

For wide planer sections, the shell portions 26 of the planers 21 may be fabricated of a box-type or reinforced truss construction as respectively shown in FIGS. 6 and 7. In FIG. 6, the shell 26 is formed of a plurality of longitudinal plate elements 29 with transverse stiffener elements 30 extending therebetween. In FIG. 7, the shell 26 is formed of a series of juxtaposed inverted V-shaped shells connected together with a plurality of longitudinally extending plate members 29 and transverse struts 31. The effective distance between the supports for the membrane 34 of the planer 21 of FIG. 7 is reduced by securing the intermediate portion of the membrane to the longitudinal joints 70 of the V-shaped sections.

Figure 9:
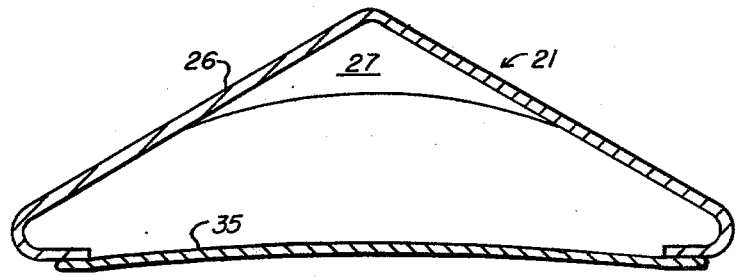
FIG. 9 is a cross-sectional view of a planer provided with a metal membrane.

Although the membrane materials preferably include elastomer coated fabrics, Kelvar and fiberglass, FIG. 9 depicts an alternative embodiment wherein a planer 21 is provided with a thin metallic membrane 35 secured to the longitudinal edge portions by threaded fasteners, welding or equivalent fastening means. Transverse stiffeners 27, like those of FIGS. 4, 5 and 8, may be connected to the shell portions 26.

Figure 10:
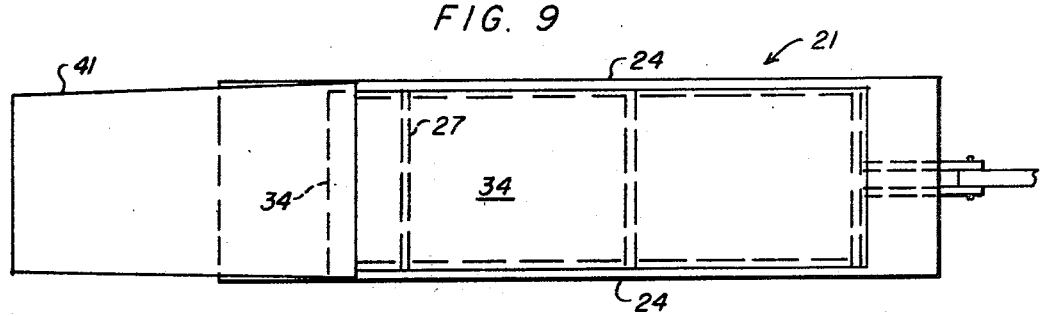
FIG. 10 is a bottom view of a planer having a tapered feather portion.
Figure 11:
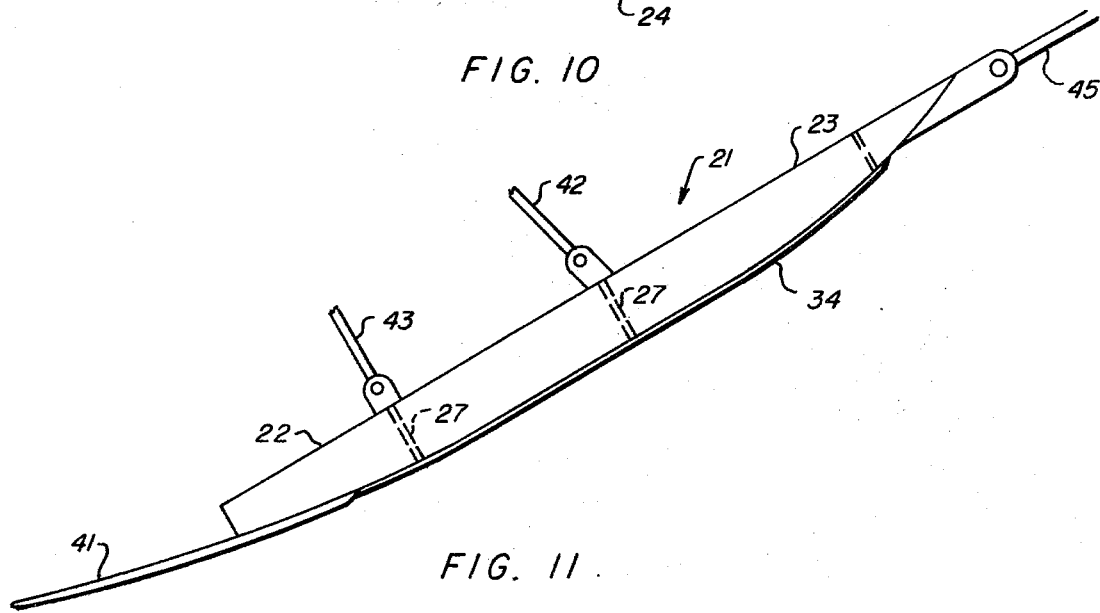
FIG. 11 is a side view of the planer of FIG. 10 with a curved planing surface.

FIGS. 10 and 11 represents a further embodiment of this invention wherein the planing surface is provided with arcuate regions to present a streamlined surface to the waves. For example, the aft end portions 22 of the planers 21 are curved to minimize the effect of impact and drag forces imposed on the planers 21 by providing a smooth transition in the interface between the planers and the water surface. The aft end portions 22 of the planers 21 are tapered in thickness, as shown in FIG. 11, to increase the flexibility of the aft end portions 22 and to reduce the discontinuity between the planer 21 and the feather 41. To reduce the tendency of the feathers 41 of adjacent planers 21 to wear against each other as the adjacent planers 21 are pivoted toward each other, the feathers 41 are tapered in width as shown in FIG. 10.

In constructing the planers 21, the shells 26 are fabricated of selected materials and the membranes 34 are then secured thereto. Although various means may be utilized to attach the membranes 34 to the planers 21, the membranes 34 are preferably secured to the longitudinal edge portions 24 of the shells 26 with overlying clamping plates 36 and fasteners 37 in the manner shown in FIGS. 4 through 8. Threaded nuts 38 are preferably welded to the longitudinal edge portions of the shells 26 to permit efficient, application of the membranes 34 to the shells 26.

Since the planers 21 function to seal the air space or gap between the water surface and the inflatable bag 15, the support arrangement of stays 45 and support straps 42, 43 cooperate to substantially maintain the fore end portions 23 of the planers 21 in contact with the lower portion of the inflatable bag 15 and the aft end portions 22 of the planers 21 in planing relationship with the water surface. For planers 21 having cross-sectional configurations such as shown in FIGS. 4, 5, 7 and 8, small inflatable cushions 47, as shown in FIGS. 1 and 2, may be positioned between adjacent planers 21 to fill-in the gap between the lower portion of the inflatable bag and the upper surfaces of the planers 21. For planers 21 having relatively flat upper surfaces, such as shown in FIG. 6, the necessity for cushions 47 is largely eliminated.

Obviously many modifications and variations of the present invention are possible in the light of the above teachings. It is therefore to be understood that within the scope of the appended claims, the invention may be practiced otherwise than as specifically described.

What is claimed is:

1. A seal structure for an air cushion marine vessel of the type having a hull with spaced, depending sidewalls for forming a plenum chamber therebetween, comprising:
    a flexible bag secured to the hull and positioned between the sidewalls to form an expansible chamber and said bag being resiliently responsive to fluid pressure changes exerted thereon;
    a plurality of elongated, juxtaposed planer members positioned between the spaced sidewalls in cooperative relationship with said bag for substantially closing-off the space between an end of the hull and the water surface;
    each said planer member comprising an elongated shell portion having spaced longitudinal edge portions and a flexible membrane portion secured to said longitudinal edge portions to form a planing surface;
    means for interconnecting said planer members along their adjacent longitudinal edge portions; and
    means for supporting said planer members in cooperative relationship with said bag so that the opposite end portions of said planer members are supported for fore and aft movements with respect to the hull of the vessel.

2. The seal structure of claim 1, further comprising:
    means for sealing the space between the adjacent longitudinal edge portions of adjacent planer members to prevent the outflow of pressurized air in the plenum chamber.

3. The seal structure of claim 1, wherein said support means includes a plurality of spaced flexible support stays secured to the hull and connected to said planer members for maintaining the fore end portion of said planer members substantially in contact with a lower portion of said bag.

4. The seal structure of claim 3, wherein said support means includes a plurality of support straps extending from the hull and connected to the aft end portions of said planer members for limiting the downward deflection of the aft end portion of said planer members.

5. The seal structure of claim 1, wherein each said shell portion includes a longitudinal central portion which is spaced from said membrane of the shell portion for accomodating inward deflections of said flexible membrane.

6. The seal structure of claim 1, wherein said shell portion has a cross-sectional configuration selected from the group of triangular, arcuate, rectangular and trapezoidal cross-sections.

7. The seal structure of claim 1, wherein said planers include aft end portions with feather elements secured thereto for maintaining a planing relationship with the water surface, said aft end portions being tapered.

8. The seal structure of claim 1, wherein said planers include aft end portions with feather elements secured thereto for maintaining a planing relationship with the water surface, said planing surface of said aft end portions being curved to provide a gradual change of the interface between said planers and the water surface.

9. A planer member for a seal structure of juxtaposed interconnected planer members for sealing one end portion of a plenum chamber defined beneath a marine air cushion vessel having a hull with depending sidewalls, comprises:
    an elongated shell portion having spaced longitudinal edge portions and a longitudinal central portion; and
    a flexible, resilient membrane connected to said longitudinal edge portions and spaced from said longitudinal central portion to form a flexible planing surface means for cushioning wave impact loads applied thereto and for distributing such loads to said longitudinal edge portions of said shell portion.

10. The planer member of claim 9, wherein said membrane is formed of a flexible thin metallic membrane which resiliently deflects in response to wave impact loads.

11. The planer member according to claim 9, wherein said membrane is formed of a flexible, fabric reinforced elastomeric material.

* * * * *